United States Patent
Wang

(10) Patent No.: US 9,953,607 B2
(45) Date of Patent: Apr. 24, 2018

(54) ARRAY SUBSTRATE AND METHOD FOR DRIVING THE SAME, AND LIQUID CRYSTAL DISPLAY PANEL

(71) Applicants: BOE TECHNOLOGY GROUP CO., LTD., Beijing (CN); BEIJING BOE DISPLAY TECHNOLOGY CO., LTD., Beijing (CN)

(72) Inventor: Xiao Wang, Beijing (CN)

(73) Assignees: BOE TECHNOLOGY GROUP CO., LTD., Beijing (CN); BEIJING BOE DISPLAY TECHNOLOGY CO., LTD., Beijing (CN)

(*) Notice: Subject to any disclaimer, the term of this patent is extended or adjusted under 35 U.S.C. 154(b) by 223 days.

(21) Appl. No.: 14/496,759

(22) Filed: Sep. 25, 2014

(65) Prior Publication Data

US 2015/0340000 A1 Nov. 26, 2015

(30) Foreign Application Priority Data

May 20, 2014 (CN) .......................... 2014 1 0212373

(51) Int. Cl.
*G09G 3/36* (2006.01)
*G02F 1/1343* (2006.01)
(Continued)

(52) U.S. Cl.
CPC ......... *G09G 3/3685* (2013.01); *G02F 1/1343* (2013.01); *G02F 1/1362* (2013.01);
(Continued)

(58) Field of Classification Search
CPC .. G02F 1/13306; G02F 1/1343; G02F 1/1362; G02F 1/1368; G02F 2001/134345; G09G 3/3685
See application file for complete search history.

(56) References Cited

U.S. PATENT DOCUMENTS

2002/0180920 A1* 12/2002 Noh .................. G02F 1/134363
349/141
2007/0159587 A1 7/2007 Kim et al.
(Continued)

FOREIGN PATENT DOCUMENTS

CN 1716067 A 1/2006
CN 1847964 A 10/2006
(Continued)

OTHER PUBLICATIONS

First Office Action regarding Chinese application No. 201410212373.5, dated Mar. 2, 2016. Translation provided by Dragon Intellectual Property Law Firm.
(Continued)

*Primary Examiner* — Afroza Chowdhury
(74) *Attorney, Agent, or Firm* — Harness, Dickey & Pierce, P.L.C.

(57) ABSTRACT

It is provided an array substrate and a method for driving the array substrate, and a liquid crystal display panel. The array substrate includes: a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes, and each of the at least two sub-pixel electrodes receives a data signal from the same one of the plurality of data lines via a corresponding switching element.

11 Claims, 3 Drawing Sheets

(51) Int. Cl.
*G02F 1/1362* (2006.01)
*G02F 1/1368* (2006.01)
*G02F 1/133* (2006.01)

(52) U.S. Cl.
CPC ........ *G02F 1/1368* (2013.01); *G02F 1/13306* (2013.01); *G02F 2001/134345* (2013.01)

(56) References Cited

U.S. PATENT DOCUMENTS

2008/0042217 A1* 2/2008 Jeong .................... G02F 1/1368
257/390
2010/0118247 A1* 5/2010 Kim .................. G02F 1/134309
349/129

FOREIGN PATENT DOCUMENTS

| CN | 1928674 A | 3/2007 |
| CN | 101315504 A | 12/2008 |
| CN | 201867560 U | 6/2011 |
| KR | 10-2007-0051036 A | 5/2007 |

OTHER PUBLICATIONS

Second Office Action regarding Chinese Application No. 201410212373.5, dated Jul. 5, 2016. Translation provided by Dragon Intellectual Property Law Firm.
Third Office Action regarding Chinese application No. 201410212373.5, dated Dec. 14, 2016. Translation provided by Dragon Intellectual Property Law Firm.

* cited by examiner

ARRAY SUBSTRATE AND METHOD FOR DRIVING THE SAME, AND LIQUID CRYSTAL DISPLAY PANEL

CROSS REFERENCE OF RELATED APPLICATION

The disclosure claims priority to Chinese patent application No. 201410212373.5, filed with the State Intellectual Property Office on May 20, 2014, which is hereby incorporated by reference in its entirety.

TECHNICAL FIELD

The disclosure relates to the technical field of display, and particularly to an array substrate and a method for driving the array substrate, and a liquid crystal display panel.

BACKGROUND

With increasing development of the flat panel display technology, Thin-Film Transistor Liquid Crystal Display (TFT-LCD) has been more and more widely used. In the TFT-LCD, each liquid crystal pixel point is driven by a thin film transistor integrated behind the liquid crystal pixel point, and information can be displayed on a screen with high speed, high lightness and high contrast.

An existing array substrate includes a substrate; a plurality of sub-pixels formed on the substrate in a matrix form, each of the plurality of sub-pixels including a thin film transistor and a pixel electrode connected to a drain electrode of the thin film transistor; a plurality of data lines, each of which is configured to provide a signal to a column of sub-pixels of the plurality of sub-pixels, the data line being connected to source electrodes of thin film transistors of a column of sub-pixels; and a plurality of gate lines, each of which is configured to provide a gate line signal to a row of sub-pixels of the plurality of sub-pixels, the gate line being connected to gate electrodes of thin film transistors of a row of sub-pixels.

A driving manner for the array substrate is driving row by row. The gate line is configured to transmit a gate signal. The data line is configured to transmit a data signal which has a time sequence matching with that of the gate signal. When the thin film transistor is turned on, the pixel electrode of the sub-pixel is charged by the data signal via the thin film transistor. Factors that have influence on the charging ratio of the sub-pixel include resolution (which has influence on charging time of a row of pixels), storage capacitance Cst of the sub-pixel, capacitance-type resistance, charging current and the like.

In a large-size liquid crystal display panel, since the storage capacitance Cst becomes larger as the area of the sub-pixel becomes larger, the charging ratio of the sub-pixel will be affected, and in the case that the frame rate for image scanning of the liquid crystal display panel is constant, the charging time of the sub-pixel is shorter, thus the sub-pixel may not be charged fully, and problems such as Mura (which refers to a phenomenon that various trails are caused by uneven lightness of the display panel) will be caused, so that image quality of the liquid crystal display panel is degraded and the development of the image liquid crystal display product with large size and high resolution is impeded.

SUMMARY

Technical problem to be solved in this disclosure is to provide an array substrate and a method for driving the same, a liquid crystal display panel, and a display device, for improving the charging ratio of the sub-pixel, avoiding the problems such as Mura due to that the sub-pixel is not charged fully, and improving the quality of the image displayed on the display panel.

To solve the above technical problems, technical solutions are provided in the embodiment of the disclosure as follows.

In an aspect, it is provided an array substrate, which includes: a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes, and each of the at least two sub-pixel electrodes receives a data signal from the same one of the plurality of data lines via a corresponding switching element.

Further, the switching element may be a thin film transistor, the sub-pixel electrode may be connected to a drain electrode of a corresponding thin film transistor, a source electrode of the thin film transistor may be connected to the data line corresponding to the sub-pixel to which the thin film transistor belongs, and a gate electrode of the thin film transistor may be connected to the gate line corresponding to the sub-pixel to which the thin film transistor belongs.

Further, each of the plurality of sub-pixels may include a first sub-pixel electrode and a second sub-pixel electrode, and the first sub-pixel electrode and the second sub-pixel electrode may receive the same data signal via the same thin film transistor.

Further, each of the plurality of sub-pixels may include a first sub-pixel area and a second sub-pixel area; the first sub-pixel area may include a first sub-pixel electrode and a first thin film transistor, the first sub-pixel electrode may receive the data signal via the first thin film transistor; the second sub-pixel area may include a second sub-pixel electrode and a second thin film transistor, the second sub-pixel electrode may receive the data signal via the second thin film transistor; and a gate electrode of the first thin film transistor may be connected to a gate electrode of the second thin film transistor.

Further, the first sub-pixel electrode may have the same area as the second sub-pixel electrode.

Further, the gate line corresponding to the sub-pixel may be located between the first sub-pixel area and the second sub-pixel area.

It is further provided a liquid crystal display panel in an embodiment of the disclosure, which includes the array substrate as described above.

It is further provided a display device in an embodiment of the disclosure, which includes the array substrate as described above.

It is further provided a method for driving an array substrate in an embodiment of the disclosure, where the array substrate includes a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes and a switching element connecting to the sub-pixel electrode correspondingly, and the method includes: sending, via the switching element of the sub-pixel, the same data signal to the corresponding sub-pixel electrodes, when a start signal is sent to the sub-pixel via the gate line.

Further, the switching element may be a thin film transistor, the sub-pixel electrode may be connected to a drain electrode of a corresponding thin film transistor, a source electrode of the thin film transistor may be connected to the data line corresponding to the sub-pixel to which the thin film transistor belongs, a gate electrode of the thin film transistor may be connected to the gate line corresponding to the sub-pixel to which the thin film transistor belongs, and the method may include: sending, via the drain electrode of the thin film transistor, the same data signal to the corresponding sub-pixel electrode, when the start signal is sent to the gate electrode of the thin film transistor via the gate line.

Further, each of the plurality of sub-pixels may include a first sub-pixel electrode and a second sub-pixel electrode, the first sub-pixel electrode and the second sub-pixel electrode may receive the same data signal via the same thin film transistor, and the method may include:

sending, via the drain electrode of the thin film transistor, the data signal to the first sub-pixel electrode and the second sub-pixel electrode respectively, when the start signal is sent to the gate electrode of the thin film transistor via the gate line.

Further, each of the plurality of sub-pixels comprises a first sub-pixel area and a second sub-pixel area; the first sub-pixel area comprises a first sub-pixel electrode and a first thin film transistor; the second sub-pixel area comprises a second sub-pixel electrode and a second thin film transistor; a gate electrode of the first thin film transistor is connected to a gate electrode of the second thin film transistor, and the method comprises:

sending, via the drain electrode of the first thin film transistor, the data signal to the first sub-pixel electrode, and sending, via the drain electrode of the second thin film transistor, the same data signal to the second sub-pixel electrode, when the start signal is sent to the gate electrode of the first thin film transistor and/or the second thin film transistor via the gate line.

DETAILED DESCRIPTION

Figure 1:
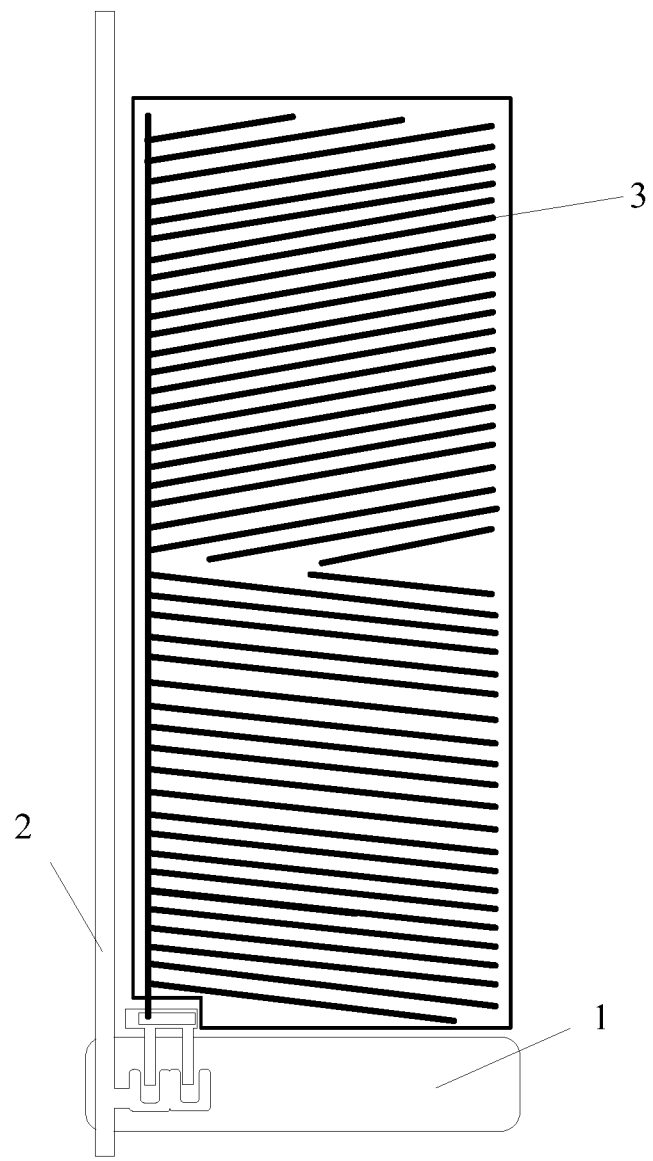
FIG. 1 is a schematic plan view of a sub-pixel in the conventional art.

In order to make the technical problem to be solved, the technical solution and the advantages in the embodiment of the disclosure more apparent, detail description is given hereinafter in conjunction with the drawings and the embodiment.

To solve the problem in the large-size liquid crystal display panel in the conventional art that the charging ratio of the sub-pixel is lower and the quality of the image on the display panel is degraded, it is provided an array substrate and a method for driving the same, a liquid crystal display panel and a display device in the embodiment of the disclosure, for improving the charging ratio of the sub-pixel, avoiding the problems such as Mura due to that the sub-pixel is not charged fully, and improving the quality of the image displayed on the display panel.

It is provided an array substrate in an embodiment of the disclosure, which includes: a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes, each of the at least two sub-pixel electrodes receives a data signal from one of the plurality of data lines via a corresponding switching element, and a control terminal of the switching element is configured to receive the same gate line signal.

In this embodiment, each sub-pixel includes a plurality of sub-pixel electrodes, each sub-pixel electrode receives the data signal via a corresponding switching element, and the storage capacitance of each sub-pixel electrode is less than the existing storage capacitance of the sub-pixel. During the charging of the sub-pixel, the storage capacitors of the plurality of pixel electrodes are charged by the data signal via the switching elements. Since the storage capacitance of the sub-pixel electrode is small, the charging ratio of the sub-pixel is increased with a fixed scanning frame rate, problems such as Mura due to that the sub-pixel is not charged fully are avoided, and the quality of the image displayed on the display panel is improved.

Specifically, the switching element is a thin film transistor, the sub-pixel electrode is connected to a drain electrode of a corresponding thin film transistor, a source electrode of the thin film transistor is connected to the data line corresponding to the sub-pixel to which the thin film transistor belongs, and a gate electrode of the thin film transistor is connected to the gate line corresponding to the sub-pixel to which the thin film transistor belongs.

In an embodiment, each of the plurality of sub-pixels includes a first sub-pixel electrode and a second sub-pixel electrode, and the first sub-pixel electrode and the second sub-pixel electrode receive the same data signal via the same thin film transistor.

In an embodiment, each of the plurality of sub-pixels includes a first sub-pixel area and a second sub-pixel area; the first sub-pixel area includes a first sub-pixel electrode and a first thin film transistor, the first sub-pixel electrode receives the data signal via the first thin film transistor; the second sub-pixel area includes a second sub-pixel electrode and a second thin film transistor, the second sub-pixel electrode receives the data signal via the second thin film transistor; and a gate electrode of the first thin film transistor is connected to a gate electrode of the second thin film transistor. Optionally, the first sub-pixel electrode has the same area as the second sub-pixel electrode. The gate line corresponding to the sub-pixel is located between the first sub-pixel area and the second sub-pixel area, and the sub-pixel is divided into the first sub-pixel area and the second sub-pixel area.

It is further provided a driving method for driving the above array substrate in an embodiment of the disclosure. The array substrate includes a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes and a switching element connecting to the sub-pixel electrode correspondingly, and the driving method includes:

sending, via the switching element of the sub-pixel, the same data signal to the corresponding sub-pixel electrodes, when a start signal is sent to the sub-pixel via the gate line.

Specifically, the switching element is a thin film transistor, the sub-pixel electrode is connected to a drain electrode of a corresponding thin film transistor, a source electrode of the thin film transistor is connected to the data line corresponding to the sub-pixel to which the thin film transistor belongs, a gate electrode of the thin film transistor is connected to the gate line corresponding to the sub-pixel to which the thin film transistor belongs, and the driving method includes:

sending, via the drain electrode of the thin film transistor, the same data signal to the corresponding sub-pixel electrodes, when the start signal is sent to the gate electrode of the thin film transistor via the gate line.

In an embodiment, each of the plurality of sub-pixels includes a first sub-pixel electrode and a second sub-pixel electrode, the first sub-pixel electrode and the second sub-pixel electrode receive the same data signal via the same thin film transistor, and the driving method includes:

sending, via the drain electrode of the thin film transistor, the data signal to the first sub-pixel electrode and the second sub-pixel electrode respectively, when the start signal is sent to the gate electrode of the thin film transistor via the gate line.

In an embodiment, each of the plurality of sub-pixels includes a first sub-pixel area and a second sub-pixel area; the first sub-pixel area includes a first sub-pixel electrode and a first thin film transistor; the second sub-pixel area includes a second sub-pixel electrode and a second thin film transistor; a gate electrode of the first thin film transistor is connected to a gate electrode of the second thin film transistor, and the driving method includes:

sending, via the drain electrode of the first thin film transistor, the data signal to the first sub-pixel electrode, and sending, via the drain electrode of the second thin film transistor, the same data signal to the second sub-pixel electrode, when the start signal is sent to the gate electrode of the first thin film transistor and/or the second thin film transistor via the gate line.

It is further provided a liquid crystal display panel including the array substrate as described above.

It is further provided a display device including the array substrate as described above. The structure and working principle of the array substrate are the same as that in the above embodiment, and are not described in detail here. Further, as to the structure of the other portions of the display device, reference can be made to the conventional art, which is not described in detail here. The display device may be a product or component having a display function, such as a liquid crystal panel, an electronic paper, a liquid crystal television, a liquid crystal display, a digital camera, a mobile phone or a tablet computer.

Factors that have influence on the charging ratio of the sub-pixel include resolution, storage capacitance Cst of the sub-pixel, capacitance-type resistance, charging current and the like. In the case that other charging conditions are constant, the storage capacitance is inverse proportional to the charging ratio. That is to say, the greater the storage capacitance of the sub-pixel is, the lower the charging ratio of the sub-pixel is. In the large-size liquid crystal display panel, the area of the sub-pixel is increased, the storage capacitance Cst is increased accordingly, so that the charging ratio of the sub-pixel is reduced. Specifically for the Advanced Dimension Switch (ADS) display panel, as shown in FIG. 1, due to its special pixel structure in which the pixel electrode 3 is in parallel to the common electrode line, and the overlapped area is larger, the storage capacitance between the pixel electrode 3 and the common electrode line is greater, so that the charging ratio of the sub-pixel is reduced, the sub-pixel may be not charged fully in the case that the charging time is short, problems such as panel Mura are caused, and the quality of the image is affected.

To solve the above problems, it is provided an array substrate in an embodiment of the disclosure, which includes: a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels includes at least two sub-pixel electrodes, and each of the at least two sub-pixel electrodes receives a data signal from the same one of the plurality of data lines via a corresponding switching element.

Specifically, respective sub-pixel electrodes of each sub-pixel are not connected to each other. The sub-pixel electrodes may receive the data signal via the same switching element. Alternatively, a plurality of switching elements may be provided, the switching elements are one-to-one corresponding to the sub-pixel electrodes, the sub-pixel electrode receives the data signal via the switching element which is one-to-one corresponding to the sub-pixel electrode, and control terminals of all switching elements are configured to receive the same gate line signal.

Specifically, the switching element may be a thin film transistor, the sub-pixel electrode may be connected to a drain electrode of a corresponding thin film transistor, a source electrode of the thin film transistor may be connected to the data line corresponding to the sub-pixel to which the thin film transistor belongs, and a gate electrode of the thin film transistor may be connected to the gate line corresponding to the sub-pixel to which the thin film transistor belongs.

The number of the sub-pixel electrodes of the sub-pixel may be determined as required. To improve the charging ratio of the sub-pixel, ideally, the higher the number of the sub-pixel electrode is, better the charging ratio of the sub-pixel is. However, the increasing of the number of the sub-pixel electrodes will result in increasing in the cost of the array substrate. Therefore, considering both the cost of the array substrate and the charging ratio of the sub-pixel, each sub-pixel may be provided with two sub-pixel electrodes.

An embodiment of the disclosure is described in detail in conjunction with the drawings by taking the ADS substrate as the array substrate according to the disclosure hereinafter.

Figure 2:
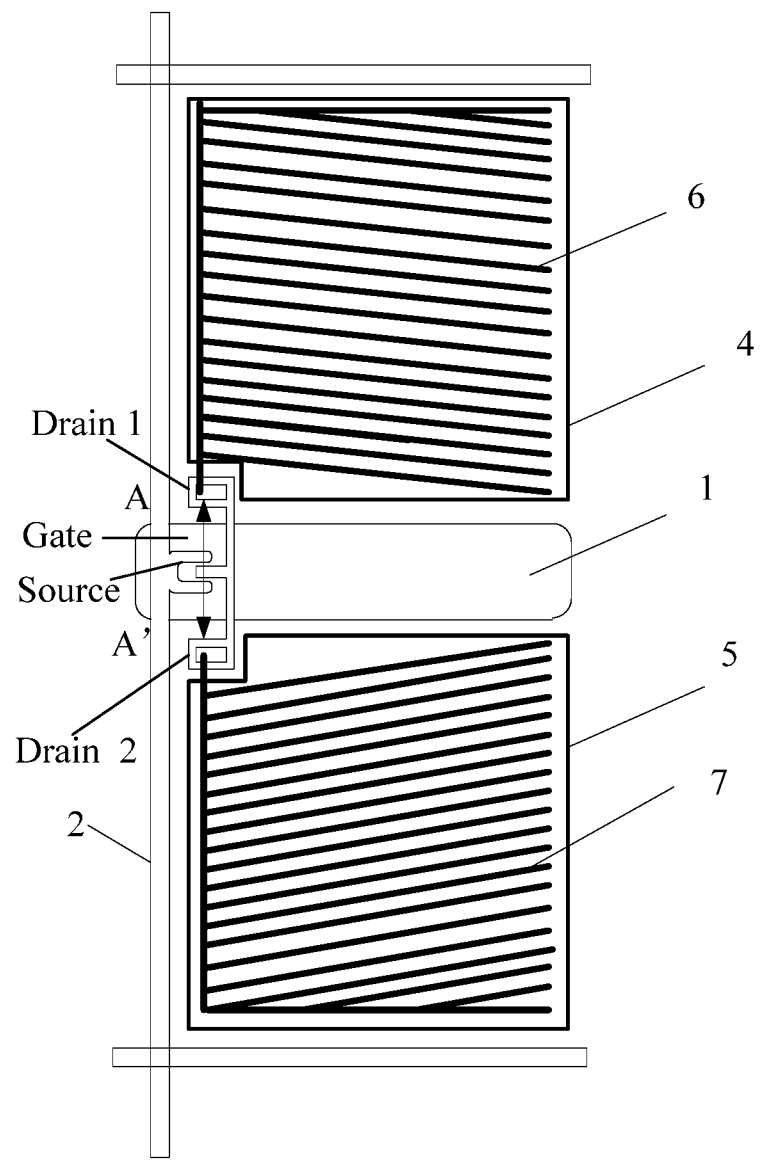
FIG. 2 is a schematic plan view of a sub-pixel of an array substrate according to an embodiment of the disclosure, where Gate and Source are gate electrode and source electrode shared by a first thin film transistor and a second thin film transistor, Drain 1 represents a drain electrode of the first thin film transistor and Drain 2 represents a drain electrode of the second thin film transistor.

As shown in FIG. 2, each sub-pixel of the ADS array substrate in this embodiment is divided into a first sub-pixel area 4 and a second sub-pixel area 5. The first sub-pixel area includes a first sub-pixel electrode 6 and the second sub-pixel area 5 includes a second sub-pixel electrode 7. The first sub-pixel electrode 6 and the second sub-pixel electrode 7 receive, via the same thin film transistor, the data signal transmitted via the data line 2. The source electrode of the thin film transistor connecting to the first sub-pixel electrode 6 and the second sub-pixel electrode 7 includes a first strip end and a second strip end. The drain electrode of the thin film transistor includes a first strip end, a second strip end, and a third strip end located between the first strip end and the second strip end of the drain electrode. The first sub-pixel electrode 6 receives the data signal via the first strip end of the drain electrode and the second sub-pixel electrode 7 receives the data signal via the second strip end of the drain electrode. The third strip end of the drain electrode is located between the first strip end of the source electrode and the second strip end of the source electrode.

Figure 3:
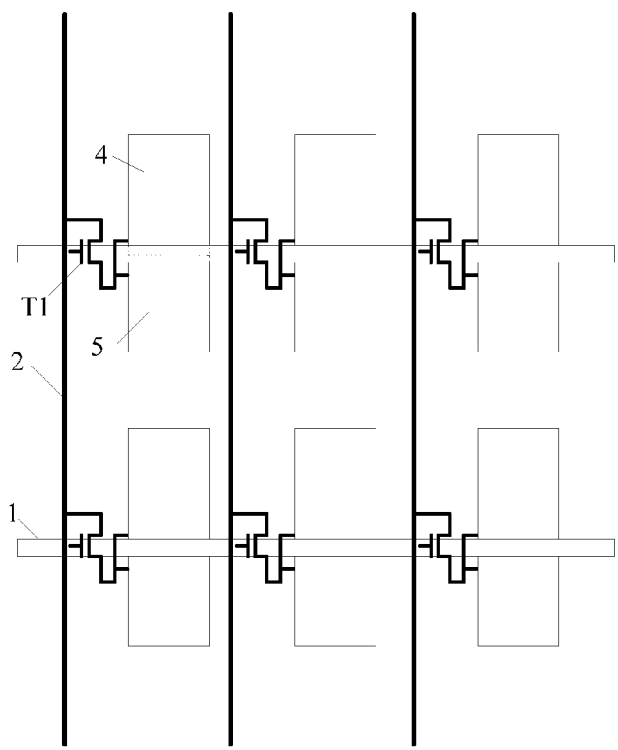
FIG. 3 is a schematic structural diagram of a pixel of an array substrate according to an embodiment of the disclosure.

In another embodiment, as shown in FIG. 3, the first sub-pixel electrode 6 in the first sub-pixel area 4 and the second sub-pixel electrode 7 in the second sub-pixel area 5 may receive the same data signal via the same thin film transistor T1, as long as the first sub-pixel electrode 6 and the second sub-pixel electrode 7 are connected to the drain electrode of this thin film transistor. The gate electrode of the thin film transistor is connected to the gate line, and the source electrode of the thin film transistor is connected to the data line.

Figure 4:
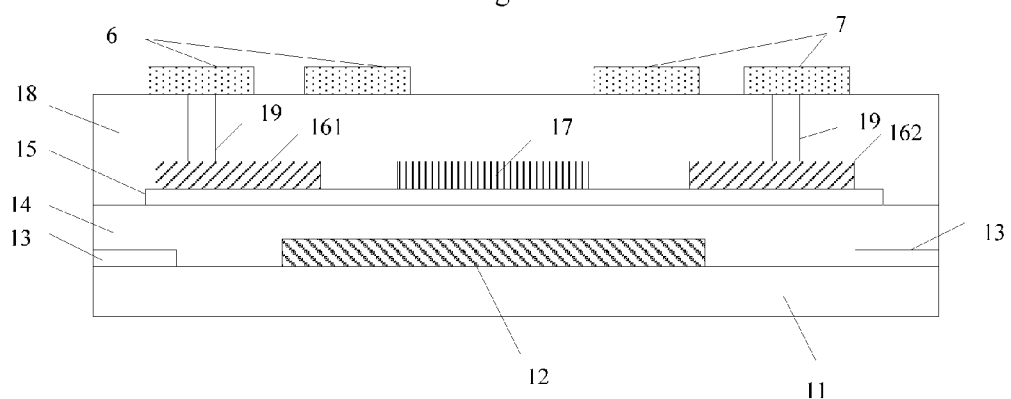
FIG. 4 is a schematic sectional view of the sub-pixel shown in FIG. 2 taken along A-A'.

FIG. 4 is a schematic sectional view of the sub-pixel shown in FIG. 2 taken along A-A'. As shown in FIG. 4, the array substrate in this embodiment include: a substrate 11, a gate electrode 12 and a common electrode 13 on the substrate, a gate insulating layer 14 on the gate electrode 12, an active layer 15 on the gate insulating layer 14, drain electrodes 161, 162 and a source electrode 17 on the active layer 15, a passivation layer 18 including a through hole 19 on the drain electrodes 161, 162 and the source electrode 17, and a first sub-pixel electrode 6 and a second sub-pixel electrode 7 on the passivation layer 18. The first sub-pixel electrode 6 is connected to the drain electrode 161 via the through hole 19. The second sub-pixel electrode 7 is connected to the drain electrode 162 via the through hole 19. In the sub-pixel shown in FIG. 4, the first sub-pixel electrode 6 belongs to the first sub-pixel area, the gate electrode of the first thin film transistor is denoted as 12, the source electrode of the first thin film transistor is denoted as 17, the drain electrode of the first thin film transistor is denoted as 161, the first sub-pixel electrode 6 receives the data signal via the drain electrode 161; and the second sub-pixel electrode 7 belongs to the second sub-pixel area, the gate electrode of the second thin film transistor is denoted as 12, the source electrode of the second thin film transistor is denoted as 17, the drain electrode of the second thin film transistor is denoted as 162, the second sub-pixel electrode 7 receives the data signal via the drain electrode 162.

Optionally, in order to balance the charging processes of the first sub-pixel area 4 and the second sub-pixel area 5, the first sub-pixel electrode 6 and the second sub-pixel electrode 7 in this embodiment have the same area, so that the storage capacitance of each sub-pixel area equals to half of that of the sub-pixel in the conventional art. To simplify the structure of the thin film transistor, the gate line corresponding to the sub-pixel may be optionally located between the first sub-pixel area and the second sub-pixel area, so that the first thin film transistor and the second thin film transistor can share the same gate electrode for connecting to the gate line.

In operation of the array substrate according to this embodiment, a start signal is transmitted to the sub-pixel via the gate line 1, and is received by the gate electrode 12 of the first and second thin film transistors, the first and second thin film transistors are turned on, the data signal is transmitted to the drain electrodes 161, 162 of the first and second thin film transistors via the source electrode of the first and second thin film transistors respectively, then the data signal is transmitted by the drain electrode 161 of the first thin film transistor to the first sub-pixel electrode 6, for charging the storage capacitor of the first sub-pixel area 4, and the data signal is transmitted by the drain electrode 162 of the second thin film transistor to the second sub-pixel electrode 7, for charging the storage capacitor of the second sub-pixel area 5.

In this embodiment, the gate line is provided in the middle of the sub-pixel. When the start signal is transmitted to the sub-pixel via the gate line, the data signal transmitted via the data line charges the storage capacitors of the first and second sub-pixel areas via the TFT respectively, and the storage capacitance is kept. The storage capacitance of each sub-pixel area is half of the storage capacitance of the sub-pixel in the conventional art, thus the charging ratio of the sub-pixel is improved, the problems such as Mura due to that the sub-pixel is not charged fully are avoided, and the quality of the image displayed on the display panel is improved.

The technical solutions of the disclosure are described by taking the ADS array substrate as an example. It should be noted that the technical solution of the disclosure is not limited to be applicable to the ADS array substrate, and may also be applicable to the Twisted Nematic (TN) array substrate, Vertical Alignment (VA) array substrate, In-Plane Switching (IPS) array substrate and the like.

The above are only preferable embodiment of the disclosure. It should be noted that several modifications and improvement may be made by those skilled in the art without deviating from the principle of the disclosure, which modifications and improvements should also be deemed as falling within the scope of protection of the disclosure.

What is claimed is:

1. An array substrate, comprising:
   a plurality of sub-pixels formed on a substrate in a matrix form;
   a plurality of data lines each configured to provide a signal to one column of sub-pixels of the plurality of sub-pixels; and
   a plurality of gate lines each configured to provide a gate line signal to one row of sub-pixels of the plurality of sub-pixels,
   wherein each of the plurality of sub-pixels comprises at least two sub-pixel electrodes, and each of the at least two sub-pixel electrodes receives a data signal from the same one of the plurality of data lines via a corresponding thin film transistor,
   wherein each sub-pixel electrode is connected to a drain electrode of a corresponding thin film transistor, a source electrode of the thin film transistor is connected to the data line corresponding to the sub-pixel to which the thin film transistor belongs, and a gate electrode of the thin film transistor is connected to the gate line corresponding to the sub-pixel to which the thin film transistor belongs, and
   wherein the at least two sub-pixel electrodes comprise a first sub-pixel electrode and a second sub-pixel electrode, and the first sub-pixel electrode and the second sub-pixel electrode are respectively connected to the drain electrode of the same thin film transistor to receive the same data signal, the source electrode of the thin film transistor connecting to the first sub-pixel electrode and the second sub-pixel electrode comprises a first strip end and a second strip end, the drain electrode of the thin film transistor connecting to the first sub-pixel electrode and the second sub-pixel electrode comprises a first strip end, a second strip end, and a third strip end located between the first strip end and the second strip end of the drain electrode, the first sub-pixel electrode receives the data signal via the first strip end of the drain electrode and the second sub-pixel electrode receives the data signal via the second strip end of the drain electrode, and the third strip end of the drain electrode is located between the first strip end of the source electrode and the second strip end of the source electrode.

2. The array substrate according to claim 1, wherein the first sub-pixel electrode has the same area as the second sub-pixel electrode.

3. The array substrate according to claim 1, wherein the gate line corresponding to the sub-pixel is located between the first sub-pixel electrode and the second sub-pixel electrode.

4. A liquid crystal display panel, comprising the array substrate according to claim 1.

5. The liquid crystal display panel according to claim 4, wherein the first sub-pixel electrode has the same area as the second sub-pixel electrode.

6. The liquid crystal display panel according to claim 4, wherein the gate line corresponding to the sub-pixel is located between the first sub-pixel electrode and the second sub-pixel electrode.

7. The liquid crystal display panel according to claim 4, wherein the first strip end and the second strip end of the source electrode are located between the first strip end and the second strip end of the drain electrode.

8. The liquid crystal display panel according to claim 4, wherein the first strip end and the second strip end of the source electrode are parallel to the plurality of gate lines, and the first strip end, the second strip end and the third strip end of the drain electrode are parallel to the plurality of gate lines.

9. The array substrate according to claim 1, wherein the first strip end and the second strip end of the source electrode are located between the first strip end and the second strip end of the drain electrode.

10. The array substrate according to claim 1, wherein the first strip end and the second strip end of the source electrode are parallel to the plurality of gate lines, and the first strip end, the second strip end and the third strip end of the drain electrode are parallel to the plurality of gate lines.

11. A method for driving an array substrate, wherein the array substrate comprises a plurality of sub-pixels formed on a substrate in a matrix form; a plurality of data lines each configured to provide a signal to one column of sub-pixels of the plurality of sub-pixels; and a plurality of gate lines each configured to provide a gate line signal to one row of sub-pixels of the plurality of sub-pixels, wherein each of the plurality of sub-pixels comprises at least two sub-pixel electrodes and a thin film transistor connecting to the at least two sub-pixel electrodes correspondingly, wherein each sub-pixel electrode is connected to a drain electrode of a corresponding thin film transistor, a source electrode of the thin film transistor is connected to the data line corresponding to the sub-pixel to which the thin film transistor belongs, and a gate electrode of the thin film transistor is connected to the gate line corresponding to the sub-pixel to which the thin film transistor belongs; and the method comprises:

sending, via the drain electrode of the corresponding thin film transistor, a data signal to the sub-pixel electrode when a start signal is sent to the gate electrode of the corresponding thin film transistor via the gate line; and wherein the at least two sub-pixel electrodes comprise a first sub-pixel electrode and a second sub-pixel electrode, and the first sub-pixel electrode and the second sub-pixel electrode are respectively connected to the drain electrode of the same thin film transistor to receive the same data signal, the source electrode of the thin film transistor connecting to the first sub-pixel electrode and the second sub-pixel electrode comprises a first strip end and a second strip end, the drain electrode of the thin film transistor connecting to the first sub-pixel electrode and the second sub-pixel electrode comprises a first strip end, a second strip end, and a third strip end located between the first strip end and the second strip end of the drain electrode, the first sub-pixel electrode receives the data signal via the first strip end of the drain electrode and the second sub-pixel electrode receives the data signal via the second strip end of the drain electrode, and the third strip end of the drain electrode is located between the first strip end of the source electrode and the second strip end of the source electrode; and the method comprises:

sending, via the drain electrode of the same thin film transistor, the data signal to the first sub-pixel electrode and the second sub-pixel electrode respectively when the start signal is sent to the gate electrode of the same thin film transistor via the gate line.

\* \* \* \* \*